US010853246B2

(12) United States Patent
Randolph et al.

(10) Patent No.: US 10,853,246 B2
(45) Date of Patent: Dec. 1, 2020

(54) INCREASING PERFORMANCE OF WRITE THROUGHPUT USING MACHINE LEARNING

(71) Applicant: EMC IP Holding Company LLC, Hopkinton, MA (US)

(72) Inventors: Benjamin A. Randolph, Uxbridge, MA (US); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 16/175,179

(22) Filed: Oct. 30, 2018

(65) Prior Publication Data

US 2020/0133857 A1 Apr. 30, 2020

(51) Int. Cl.
*G06F 12/00* (2006.01)
*G06F 12/0802* (2016.01)
*G06N 5/04* (2006.01)
*G06N 20/00* (2019.01)

(52) U.S. Cl.
CPC ........... *G06F 12/0802* (2013.01); *G06N 5/04* (2013.01); *G06N 20/00* (2019.01); *G06F 2212/262* (2013.01)

(58) Field of Classification Search
CPC .......... G06F 12/0802; G06F 2212/262; G06N 20/00; G06N 5/04
USPC ....................................................... 711/118
See application file for complete search history.

(56) References Cited

U.S. PATENT DOCUMENTS 9,026,765 B1* 5/2015 Marshak ................. G06F 3/061
 711/114
2013/0103764 A1* 4/2013 Verkasalo .............. G06N 20/00
 709/204

OTHER PUBLICATIONS

Intel and Micron Technology, "3D XPoint," Jul. 2015.

* cited by examiner

*Primary Examiner* — Mardochee Chery
(74) *Attorney, Agent, or Firm* — Muirhead and Saturnelli, LLC

(57) ABSTRACT

Techniques for processing data may include: determining a first amount denoting an amount of write pending data stored in cache to be redirected through storage class memory (SCM) when destaging cached write pending data from the cache; performing first processing that destages write pending data from the cache, the first processing including: selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and subsequent to storing the first portion of write pending data to the SCM, transferring the first portion of write pending data from the SCM to the one or more physical storage devices providing back-end non-volatile physical storage.

16 Claims, 14 Drawing Sheets

600

| Current/Next State | Low | Medium | High |
|---|---|---|---|
| Low | 12,342 | 4357 | 1890 |
| Medium | 3242 | 789,786 | 89,098 |
| High | 345 | 879,089 | 33,798 |

610 / 612 / 614 / 616
616a / 616b / 616c

| Current/Next State | Low | Medium | High |
|---|---|---|---|
| Low | 66.4% | 23.4% | 10.2% |
| Medium | 0.4% | 89.5% | 10.1% |
| High | 0.0% | 96.3% | 3.7% |

INCREASING PERFORMANCE OF WRITE THROUGHPUT USING MACHINE LEARNING

BACKGROUND

Technical Field

This application generally relates to data storage, and more particularly techniques used in connection with destaging data from cache.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing data comprising: determining a first amount denoting an amount of write pending data stored in cache to be redirected through storage class memory (SCM) when destaging cached write pending data from the cache; performing first processing that destages write pending data from the cache, the first processing including: selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and subsequent to storing the first portion of write pending data to the SCM, transferring the first portion of write pending data from the SCM to the one or more physical storage devices providing back-end non-volatile physical storage. A relative performance ranking may rank the cache as having a higher performance than the SCM, and the SCM as having a higher performance than the one or more physical storage devices providing back-end non-volatile physical storage. The SCM may be byte addressable. The method may include determining, using a Markov chain state machine (MCSM) included in a predictor, a predicted probabilistic risk of transitioning from a current state to a high state of heavy write throughput; and providing the probabilistic risk from the predictor as an input to a controller. The MCSM may use a matrix of state transition probabilities to determine the predicted probabilistic risk of transitioning from the current state to the high state of heavy write throughput. The controller may determine the first amount in accordance with a plurality of inputs including the predicted probabilistic risk of transitioning from the current state to the high state of heavy write throughput. The first plurality of inputs to the controller may further include a set point denoting a current acceptable level of probabilistic risk of transitioning to the high state of heavy write throughput, and a delta risk value that is a difference between the current acceptable level of probabilistic risk and the predicted probabilistic risk of transitioning from the current state to the high state of heavy write throughput. The first amount may be expressed as a first percentage denoting a percentage of write pending data to be destaged indirectly through the SCM. The controller may determine the first amount for a current time period in accordance with the delta risk value for the current time period and a first weighting constant, a sum of delta risk values from time periods prior to the current time period and a second weighting constant, and a rate of change in delta risk values for the current time period and an immediately prior time period and a third weighting constant. The matrix of state transition probabilities used by the MCSM may be determined by observed transitions between states in accordance with observed write throughput. The MCSM may include three states and the matrix may include nine entries denoting transitions from a current state denoting one of the three states to a next state denoting one of the three states. Each of the three states may be associated with a different range of write throughput.

In accordance with another aspect of techniques herein is a system comprising: a processor; and a memory comprising code stored thereon that, when executed, performs a method of processing data comprising: determining a first amount denoting an amount of write pending data stored in cache to be redirected through storage class memory (SCM) when destaging cached write pending data from the cache; performing first processing that destages write pending data from the cache, the first processing including: selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and subsequent to storing the first portion of write pending data to the SCM, transferring the first portion of write pending data from the SCM to the one or more physical storage devices providing back-end non-volatile physical storage.

In accordance with another aspect of techniques herein is a computer readable medium comprising code stored thereon that, when executed, performs a method of processing data comprising: determining a first amount denoting an amount of write pending data stored in cache to be redirected through storage class memory (SCM) when destaging cached write pending data from the cache; performing first processing that destages write pending data from the cache, the first processing including: selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and subsequent to storing the first portion of write pending data to the SCM, transferring the first portion of write pending data from the SCM to the one or more physical storage devices providing back-end non-volatile physical storage. A relative performance ranking may rank the cache as having a higher performance than the SCM, and the SCM as having a higher performance than the one or more physical storage devices providing back-end non-volatile physical storage. The SCM may be byte addressable. The method may include determining, using a Markov chain state machine (MCSM) included in a predictor, a predicted probabilistic risk of transitioning from a current state to a high state of heavy write throughput; and providing the probabilistic risk from the predictor as an input to a controller. The MCSM may use a matrix of state transition probabilities to determine the predicted probabilistic risk of transitioning from the current state to the high state of heavy write throughput. The controller may determine the first amount in accordance with a plurality of inputs including the predicted probabilistic risk of transitioning from the current state to the high state of heavy write throughput. The first plurality of inputs to the controller may further include a set point denoting a current acceptable level of probabilistic risk of transitioning to the high state of heavy write throughput, and a delta risk value that is a difference between the current acceptable level of probabilistic risk and the predicted probabilistic risk of transitioning from the current state to the high state of heavy write throughput. The controller may determine the first amount for a current time period in accordance with the delta risk value for the current time period and a first weighting constant, a sum of delta risk values from time periods prior to the current time period and a second weighting constant, and a rate of change in delta risk values for the current time period and an immediately prior time period and a third weighting constant.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10 and 11 are examples illustrating machine learning used to determine transition probability matrices in an embodiment in accordance with techniques herein;

DETAILED DESCRIPTION OF EMBODIMENT(S)

Figure 1:
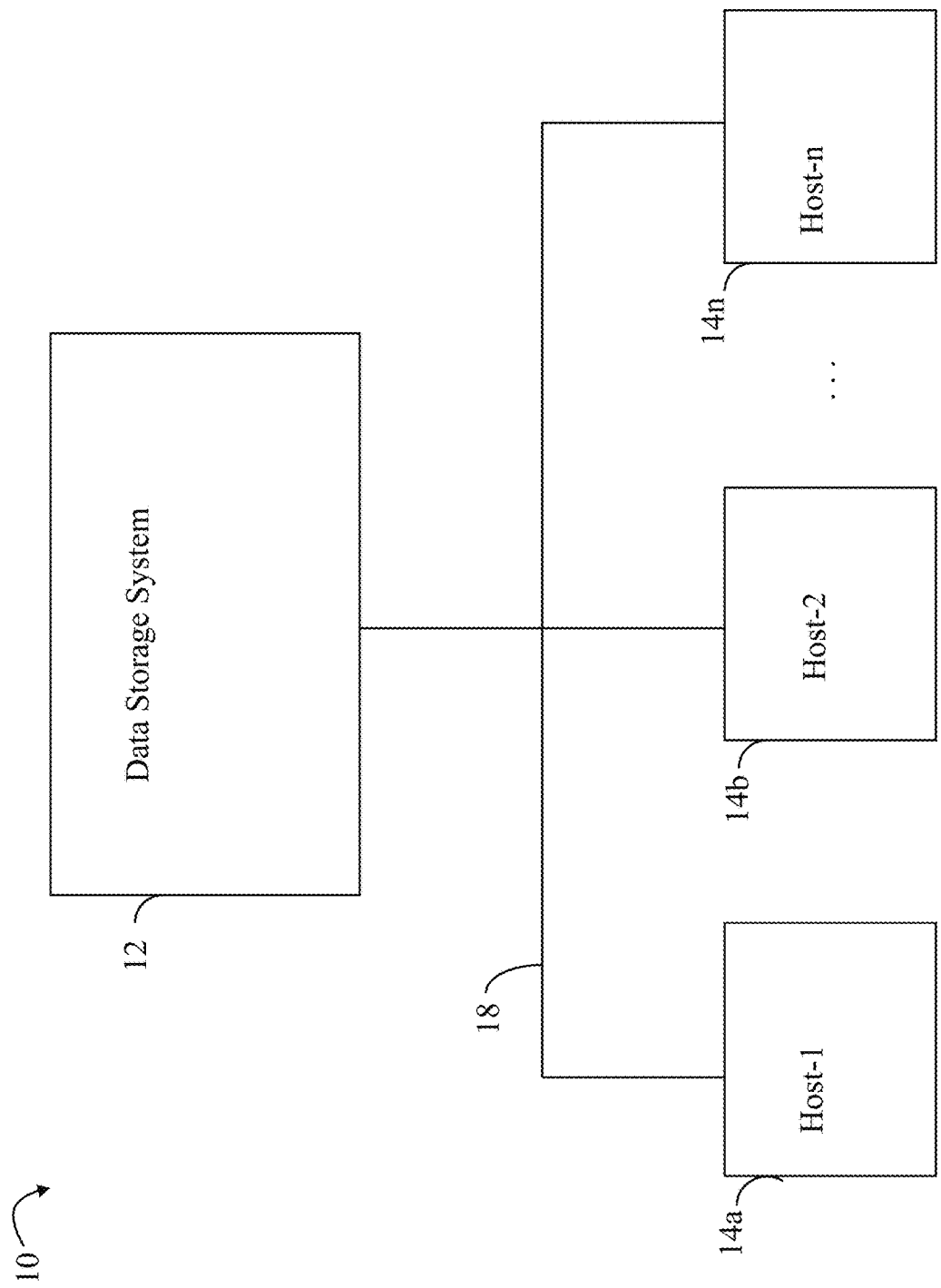
FIG. 1 is an example of an embodiment of systems and components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12. It should be noted that the data storage system 12 of FIG. 1 may physically be a single data storage system, such as a single data storage array as Dell EMC™ PowerMAX™ data storage system, as well one or more other data storage systems as may vary with the embodiment.

Figure 2A:
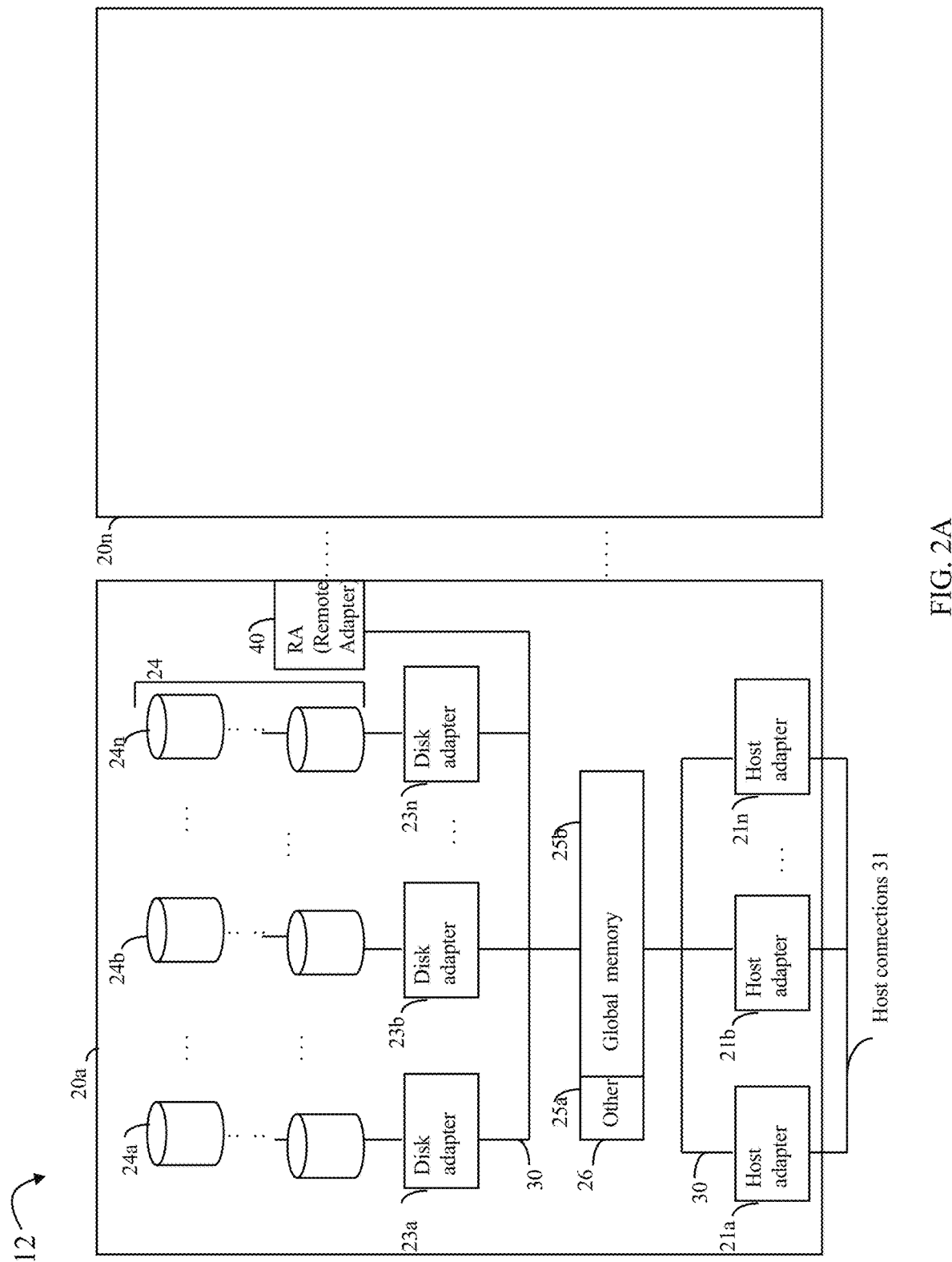
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20*a*-20*n* as may be manufactured by one or more different vendors. Each of the data storage systems 20*a*-20*n* may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20*a*. It should be noted that a similar more detailed description may also apply to any one or more of the other elements, such as 20*n*, but have been omitted for simplicity of explanation. It should also be noted that an embodiment may include data storage systems from one or more vendors. Each of 20*a*-20*n* may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20*a*, may include a plurality of disk devices or volumes, such as the arrangement 24 consisting of n groupings of disks or more generally, data storage devices, 24*a*-24*n* which are physical storage devices providing backend physical storage. In this arrangement, each of the n groupings of disks or physical storage devices may be connected to a disk adapter ("DA") or director responsible for the backend management of operations to and from a portion of the disks 24. In the system 20*a*, a single DA, such as 23*a*, may be responsible for the management of a grouping of disks, such as grouping 24*a*. In a data storage system such as a data storage array, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices (PDs) providing the back-end physical storage may include any suitable non-volatile storage such as, for example, rotating disk drives, flash-based drives or more generally solid state drives, and the like.

Also shown in the storage system 20*a* is an RA or remote adapter 40. The RA may be hardware including a processor used to facilitate communication between data storage systems, such as between two of the same or different types of data storage systems. For example, in an embodiment, the storage systems 20*a*-20*n* may each include one or more Remote Data Facility (RDF) adapter units 40. An RDF product may be used to copy data from one storage system to another. For example, if a host writes data to a first storage system (e.g., a local storage system), it may be desirable to copy that data to a second storage system provided in a different location (e.g., a remote storage system). The RAs of two data storage systems, such as 20*a* and 20*n*, may communicate over an RDF link (not illustrated) between the two data storage systems to transfer data between the two data storage systems. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The system 20*a* may also include one or more host adapters ("HAs") or directors 21*a*-21*n*. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25*b* may be used to facilitate data transfers and other communications between the DAs, HAs and RAs in a data storage system. In one embodiment, the DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
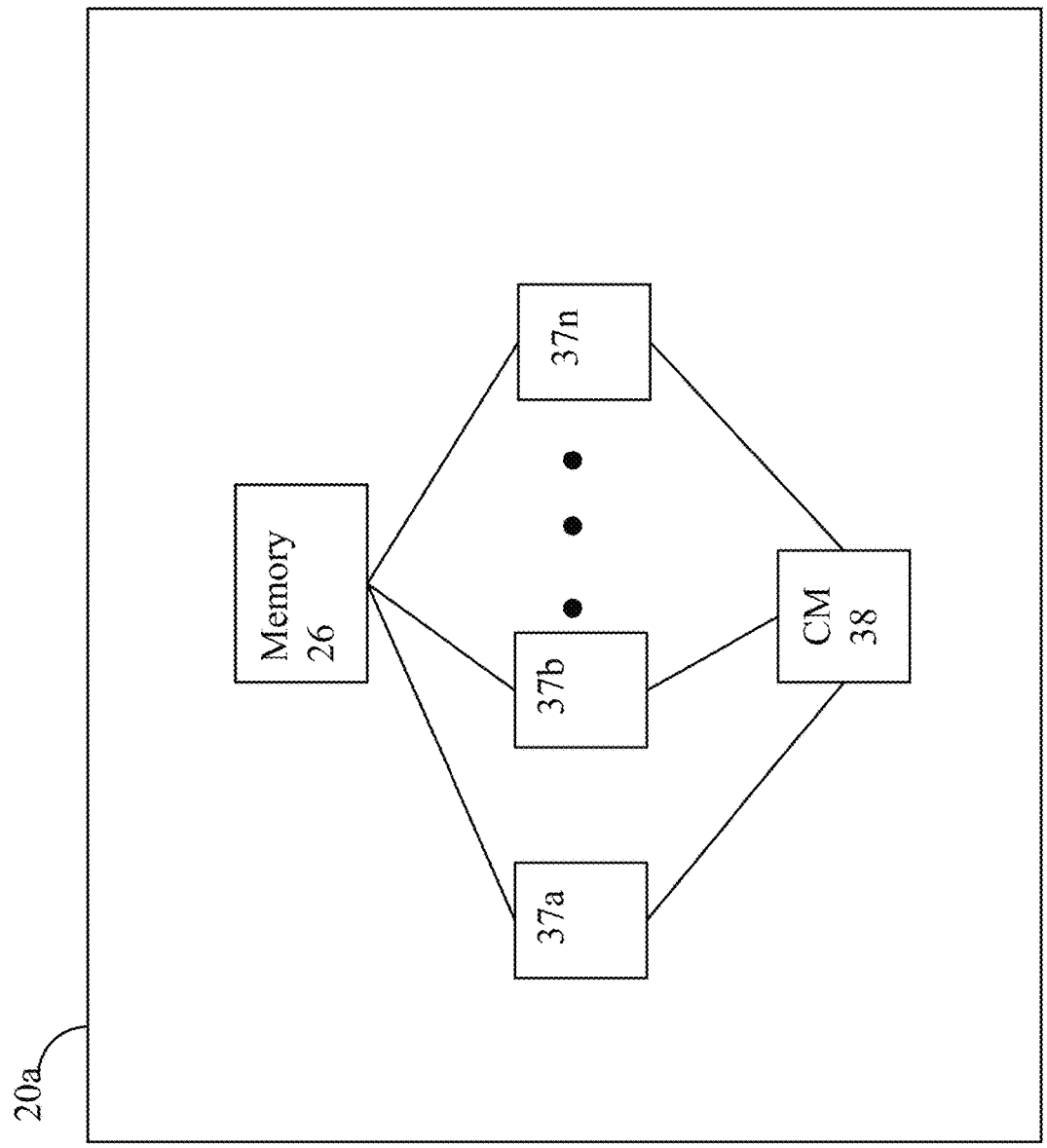
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

As described above, the data storage system 12 may be a data storage array including a plurality of data storage devices 16a-16n in which one or more of the devices 16a-16n are flash memory devices employing one or more different flash memory technologies. In an embodiment in accordance with techniques herein, the data storage devices 16a-16n may include a combination of rotating disk devices and flash devices, or all flash devices, in which the flash devices may appear as standard Fibre Channel (FC) drives to the various software tools used in connection with the data storage array. The flash devices may be constructed using suitable storage technology and media, such as, for example, nonvolatile semiconductor NAND flash memory. The flash devices may include, for example, one or more SLC (single level cell) devices and/or MLC (multi level cell) devices, as well as other suitable storage technologies.

It should be noted that the techniques herein may be used in connection with physical storage devices (e.g., PDs 16a-16n) used as backend non-volatile storage including flash devices that may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. An embodiment in accordance with techniques herein may include one or more defined storage tiers each including different types and classifications of PDs used as back-end non-volatile storage devices. For example, at least one embodiment may include a first tier of flash drives and a second tier of one type of rotating disk drives (e.g., 15K RPM drives). Generally, the tiers have an associated relative performance ranking. For example, the foregoing first tier may have a higher ranking in terms of performance capabilities than the second tier. As such, I/Os that access data stored on a PD of the higher performance first tier typically result in average lower I/O response times (e.g., better I/O performance) that other I/O accessing data stored on a PD of the slower, lower performance second tier.

In connection with performing I/O operations, such as writes as well as reads, a data storage system in an embodiment in accordance with techniques herein may use a cache in order to improve performance.

Figure 3:
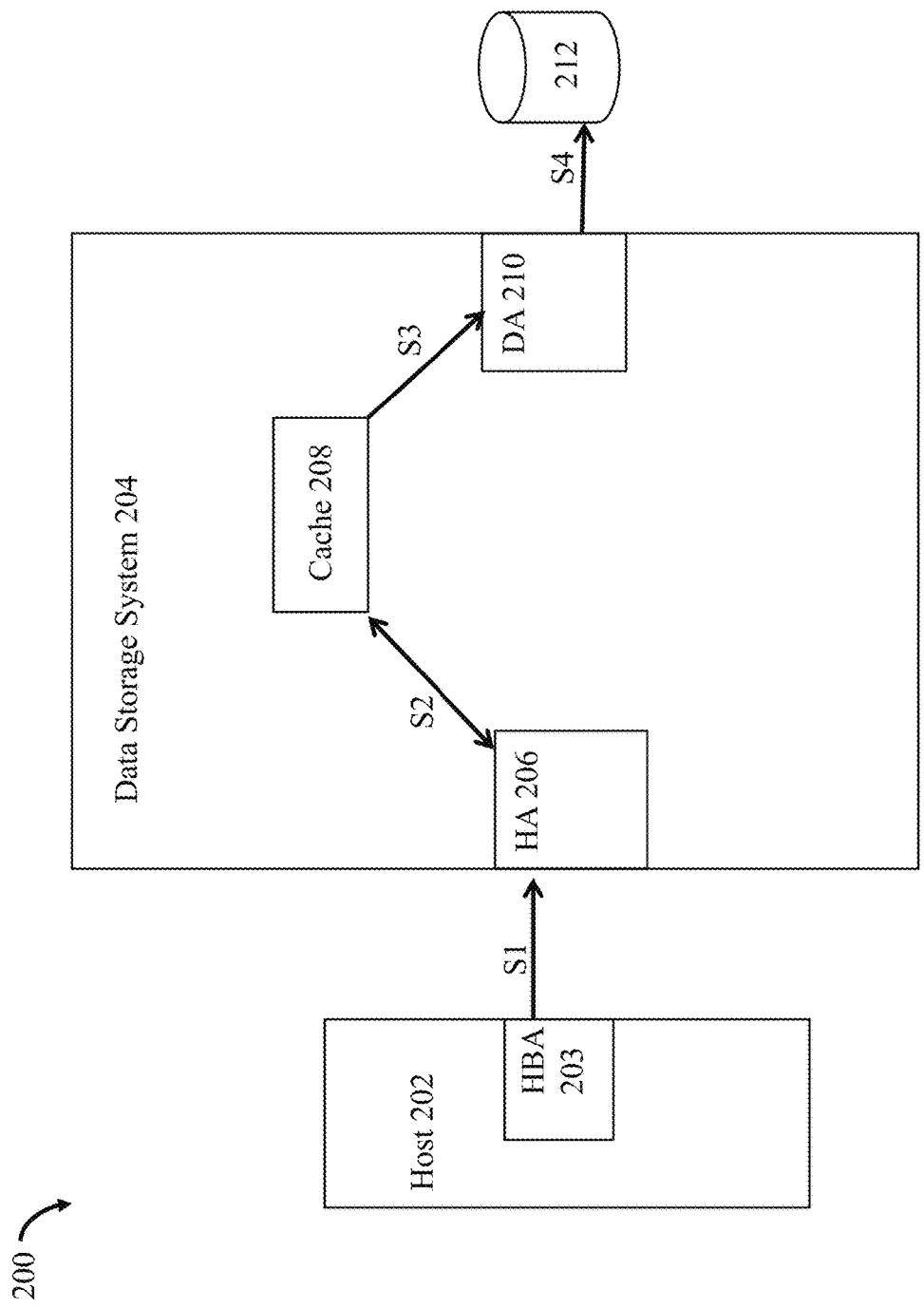
FIGS. 3 and 4 are examples illustrating processing that may be performed in connection servicing I/O operations on the data storage system in an embodiment in accordance with techniques herein.

Referring to FIG. 3, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 4:
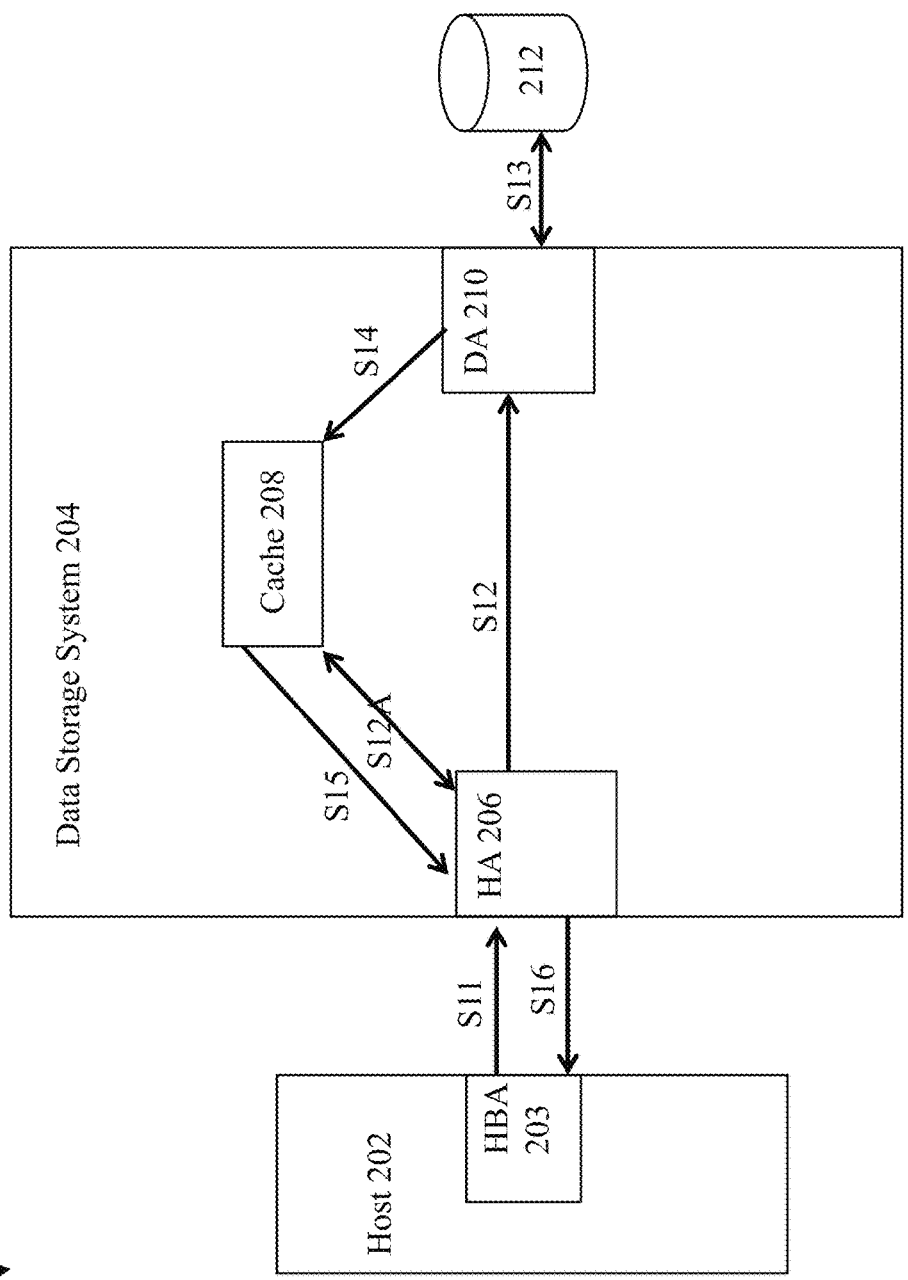

Referring to FIG. 4 shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S5 from the cache 208 and then return the requested read data (as retrieved from cache) to the host 202 in step S16.

Requests to read and/or write data, such as for I/O operations received by an HA of the data storage system from the host, identify a location of where data is read from or written to, where such location may be expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

The cache, like other data storage system resources, may be a finite resource whereby the data storage system may have a limited amount of cache for storing user data in connection with servicing read and/or write operations, such as described above. There may be times when data cache consumption for storing user data, such as WP data and read miss data, in a data storage system may reach an undesirable level and processing may be performed to destage WP data from cache to physical storage. As noted above, destaging includes writing out WP data from cache to a physical storage device, such as a physical drive.

The size of a single unit of cache data may be referred to herein as a page where a single page is the granularity with which cached data is destaged from cache. The size of a page may vary with embodiment. Thus the granularity or amount of data to be destaged in a single destaging operation may vary with embodiment. In one exemplary embodiment, the size of a page denoting an amount of data that can be destaged from cache as a single unit may be N tracks, where N=42 tracks (e.g., each track may be, for example, 128K bytes of data). In a single cache page, not all the data of the single cache page may be WP data. For example, within a single cache page, it may be that one or more portions of the page include WP data as well as non-WP data. For example, the cache page may include non-WP data that includes data read from a physical device and stored in the cache page in connection with servicing a read miss operation. Additionally, one or more portions of the same cache page including WP data may be empty and contain no data.

Figure 5:
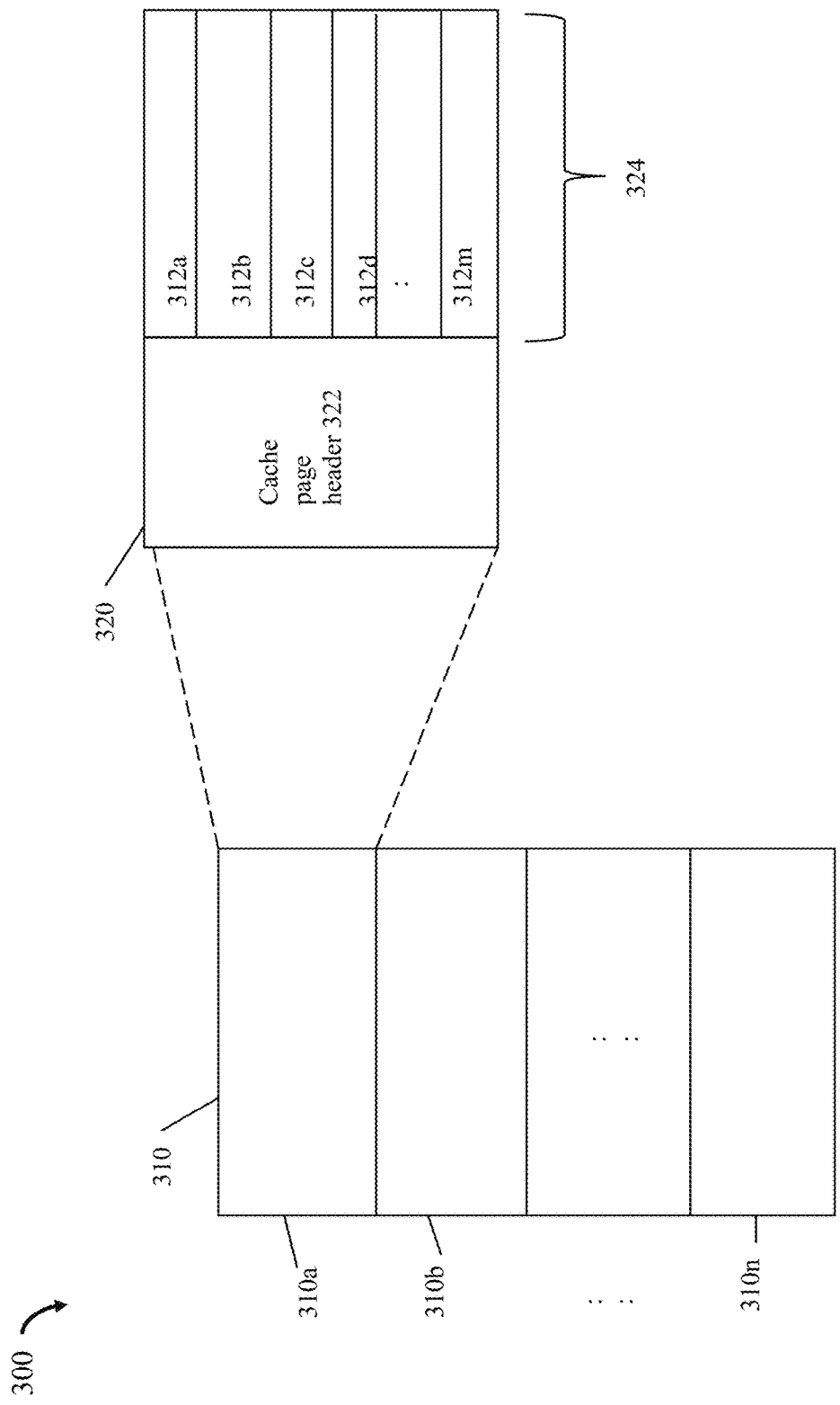
FIG. 5 is an example illustrating a logical representation of a data cache that may be used in an embodiment in accordance with techniques herein.

Referring to FIG. 5, shown is an example illustrating a logical representation of a data cache that may be used in an embodiment in accordance with techniques herein. In the example 300, element 310 may represent the memory or storage used as the data cache which is partitioned into cache pages 310a-310n. It should be noted that the example 300 is a logical representation of a cache that may be implemented using any suitable data structure(s) known in the art. As described elsewhere herein, each of the cache pages 310a-n may contain varying amounts of WP data. Element 320 provides additional detail of single cache page 320. Cache page 320 may include a cache page header 322 and cache page data 324. The cache page data 324 illustrates that a single cache page of data may further include multiple portions 312a-m each of which may or may not include WP data and each of which may or may not include any cached data. The cache page header 322 may include additional information, such as metadata, regarding the cached data stored in 324. For example, the header 322 may denote whether the data cached in each of the portions 312a-m is WP data.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 310 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 310a (illustrated in more detail by 320), not all the data of the single cache page may be WP data. For example, within a single cache page, it may be that one or more portions 312a-m of the page 320 include WP data as well as non-WP data. For example, the cache page 320 may include non-WP data in 312a and 213c (e.g., 312a and 312c may include data read from a physical device and stored in the cache page in connection with servicing a read miss operation). Additionally, one or more portions 312a-m of the same cache page 320 including WP data may be empty and contain no data. For example, all of page 320 may include WP data except for 312a-b which may contain no cached data.

It should be noted that each portion 312a-m of a cache page may correspond, for example, to a track or other storage size unit. In an embodiment having a cache page size of 42 tracks, "m" denoting the number of portions in a single cache page 320 may be 42. For each track of a cache page, some or all data of a single track may be stored in cache since the size unit for reading and writing data may be less than a track. In connection with determining a current amount of the data 310 cache that is consumed for WP data, only those one or more portions 312a-m of each cache page 310a-n including WP data are considered. The current amount of cache data consumed for storing WP data may be expressed in units of granularity such as at the track level represented by each of 312a-m. If any single track, or more generally, single data portion (e.g., one of 312a-m) includes any WP data, the track may be counted as consumed for storing WP data.

The cache, like other data storage system resources, is a finite system resource whereby the data storage system may have a limited amount of cache for storing user data in connection with servicing read and/or write operations, such as described above. A cache location including WP data cannot be overwritten or reused until the WP data has been written out to PDs providing the non-volatile backend physical storage. Thus, the data storage system may destage data from cache at various points in time. In one embodiment, the frequency with which WP data is destaged may vary in accordance with how much of the data cache is consumed for storing WP data. In one embodiment, a process may be executed to perform WP data cache destaging. An embodiment may define a threshold amount of cache consumed for storing WP data. For example, the threshold amount may be a percentage of the data cache such as 75% or 80%. This particular threshold amount may be referred to as the system WP (SWP) limit. In some embodiments, the SWP limit may be configurable. The process performing the destaging may monitor the amount of cache consumed for WP data and the process may be scheduled to run at different points in time for an amount of time. The frequency with which the process is executed and/or the amount of time the process performing the destaging is executed may increase as the amount of data cache consumed for storing WP data approaches the SWP limit. The goal of such destaging is to reduce the amount of cache consumed for WP data thereby making the cache storage of the destaged WP data available, such as for storing other write data of new write operations received after the destaging is performed. Thus, the closer the amount of consumed data cache for storing WP data is to the SWP limit, the more aggressive may be the destaging. The aggressiveness of the destaging may be increased by, for example, increasing the amount of time the above-mentioned process executes each time and/or increasing the frequency at which the process is executed. It should be noted that the foregoing is an example of one type of trigger event that may affect the rate or frequency at which data is destaged from cache to physical storage. More generally, an embodiment may perform destaging responsive to an occurrence of any one or more defined trigger events that may vary with embodiment.

In connection with destaging data, each single destaging operation may operate on data stored in a single cache page. Thus, for a single destage operation in which a single cache page is 42 tracks, a maximum of 42 tracks of WP data is destaged from cache to physical storage (e.g., if the single cache page is full and includes only WP data). If the single cache page does not include 42 tracks of WP data, the destaging of the cache page results in destaging only those data portions of the page which are WP. Further, due to various RAID configurations and overhead (e.g., such as for determining and storing parity information for RAID-5 groups) incurred when performing writes of data in such RAID groups, it may be most efficient to destage a cache page when full of data (e.g., contains all 42 track of data).

Figure 6:
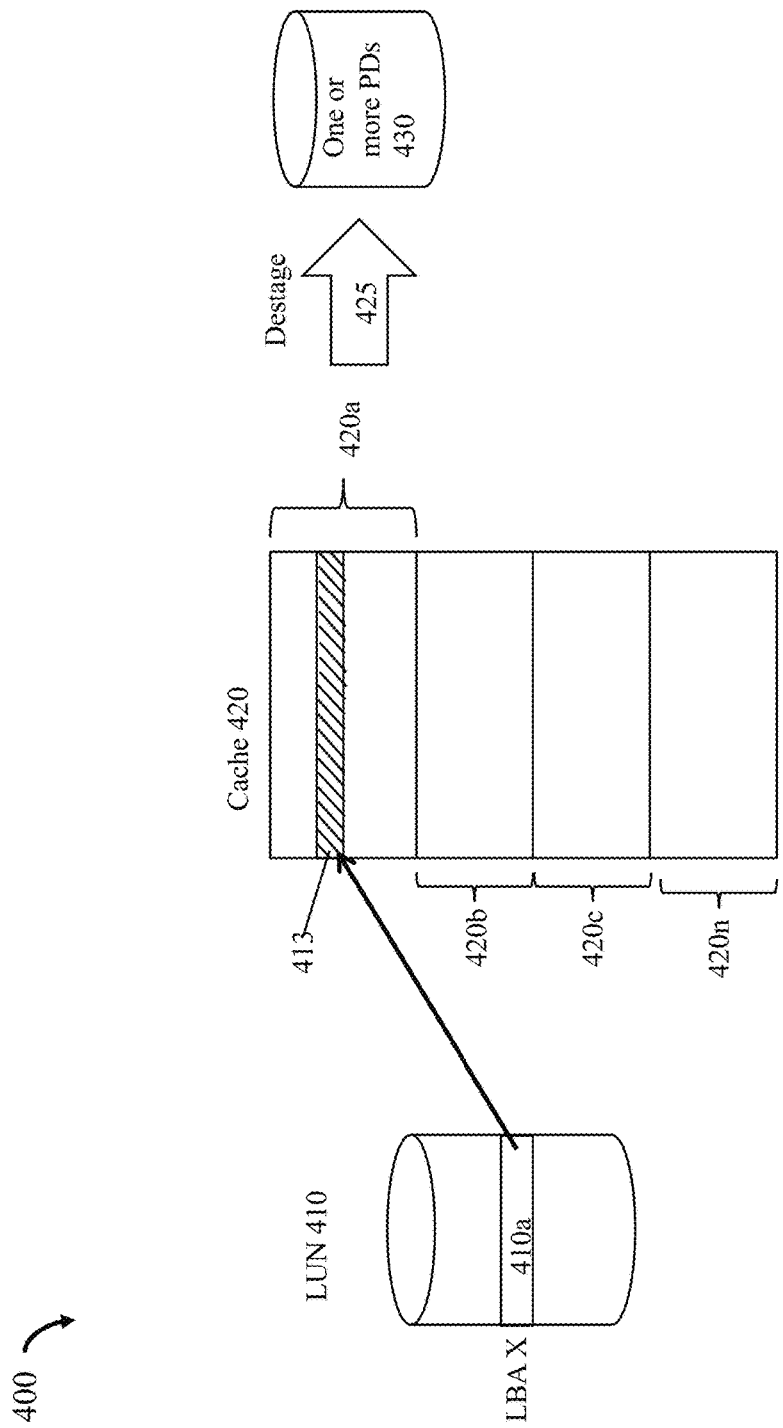
FIG. 6 is an example illustrating use of a data cache in connection with a write operation in an embodiment in accordance with techniques herein.

Referring to FIG. 6, shown is an example illustrating different views of cached data in an embodiment in accordance with techniques herein. The example 400 includes LUN 410, cache 420 and one or more PDs 430. Cache 420 may include cache pages 420a-n. Cache 420 may be a data cache similar to that as described elsewhere herein (e.g., element 310 of FIG. 5 and element 208 of FIGS. 3 and 4). An HA may receive a write operation to store write data at a LUN offset or LBA X of LUN 410. Element 410a may denote the write data written to LBA X of LUN 410. The HA may write the data 410a to cache location 413 included in cache page 420a of cache 420 whereby cache location 413 may be marked as containing WP data. The foregoing use and mapping of LUNs/LBA to cache may be characterized as the HA or front end component view where the HA uses data storage locations expressed in terms of LUNs and LBAs.

At a later point in time after write data 410a is placed in the cache at location 413, a DA may destage 425 data from cache page 420a to one or more PDs 430. For destaging, the DA operates on single cache pages destaging data of the single cache page 420a. The foregoing use and mapping of cache to PD/PD location may be characterized as the DA or backend component view where the DA uses data storage locations expressed in terms of PDs and PD locations.

Each cache page may include data stored at logically contiguous sequential LBA locations (e.g., each cache page corresponds or maps to a contiguous, consecutive LBA range of a LUN). For example, assuming a cache page size of 42 tracks, cache page 420a may include data stored on tracks 0-41 of LUN 410.

Although only a single LUN is illustrated, there may be I/Os directed to many different LUNs whereby destaging may include generally destaging cached WP data of one or more LUNs. Thus, generally, responsive to an occurrence of one or more trigger events (e.g., where one such trigger event may be reaching or approaching the SWP limit or more generally the amount of free or available cache is below some specified threshold), processing may be performed to destage WP data from cache to physical storage (e.g., PDs).

Data storage systems may encounter a variety of I/O workload patterns. Generally, it may be desirable to maintain a stable and relatively low percentage of outstanding cache commits or WP I/Os having WP data stored in a data storage system's cache. The storage system may have multiple layers to facilitate improved performance under the varied I/O workloads such as those that may include I/O workloads that are read-miss heavy and write heavy. One of the most difficult I/O workloads to handle is a heavy random-address write burst.

Under such write-heavy random I/O bursts, the cache may become quickly overloaded increasing the percentage of WP data, and thus amount of consumed cache for storing WP data. Consistent with discussion above and elsewhere herein, such heavy write I/O bursts may overwhelm the data storage system by consuming an undesirable amount of cache for storing WP data at a single point in time, such as where the amount of consumed cache for WP data exceeds a specified maximum threshold, or where the amount of free or available cache falls below a specified minimum threshold, and may result in occurrence of a trigger condition based on one or more such thresholds. As described herein the occurrence of a trigger condition related to the foregoing threshold(s) may trigger destaging of WP data from the cache to PDs in efforts to decrease the amount of WP data in cache and thereby increase the amount of free or available cache for storing the new WP data of the write I/O burst. However, the destaging of cached WP data to PDs used as the backend non-volatile storage may not occur at a sufficient pace or rate to keep up with the demand for free cache to store newly received WP data of the write I/O bursts. As a result, data storage system performance may be unacceptably slow during periods of such write bursts.

Described in following paragraphs are techniques that may be used to facilitate increased write performance and provide for quicker, more timely removal of WP data from cache such as when destaging such WP data from cache. In at least one embodiment, such techniques may use a Storage Class Memory (SCM) as an additional target storage to which WP cached data may be placed as part of destaging. A portion of the WP data of the cache being destaged may be directly stored on the PDs (providing the backend non-volatile storage). Another second portion of the WP data of the cache being destaged may be routed indirectly through another path for storage on the PDs. This latter second portion of the WP data of the cache being destaged may first be diverted for storage in the SCM, and then subsequently copied or transferred from SCM to the PDs. Destaging cached WP data through both the foregoing direct path (e.g. WP data destaged may be directly stored on the PDs) and indirect path (e.g., through SCM and then PDs) to the PDs provides for removal of the WP data from cache at a quicker rate than when WP data is only destaged through the slower direct path. Thus, such techniques may provide for accelerating the removal of WP data from cache, and thus making additional cache available at an accelerated rate, as compared to destaging only through the slower direct path (e.g., WP data being destaged may be directly stored on the PDs without diverting through SCM).

Techniques described in following paragraphs learn to predict the write throughput of periods of high write I/O activity and leverage a control system to prevent overload. In at least one embodiment, a Markov Chain model may be used to define levels of I/O workload and predict the probability of write throughput at a subsequent point in time. The model may then provide a predicted I/O workload level in terms of write throughput or write data rate (e.g., amount of data written per unit of time such as 10 KBs per second) as an input to a control system that performs processing to control the write burst using SCM diverting mechanisms as part of destaging WP data from the cache. In at least one embodiment, a control system may be used which dynamically adjusts the amount of WP data in cache diverted through the SCM. Such a control system may be characterized as having a "memory" as known in the art since the output of the control system depends on prior inputs.

Prior to describing techniques that use SCM, a further description of SCM is initially provided in following paragraphs. SCM is generally a persistent non-volatile form of memory or storage that typically has particular characteristics. An example of SCM is 3D)(Point® memory storage jointly developed by Intel and Micron Technology Inc. In one aspect, SCM may be characterized as based on technologies that fill a gap in the storage market between dynamic RAM (DRAM) and flash-based storage devices, such as PDs of a storage tier using NAND flash media. Thus, SCM is a class of memory technology having performance characteristics that fall between DRAM and flash performance characteristics whereby DRAM (e.g., as may be used as cache memory) generally has higher performance than SCM and whereby SCM typically has higher performance than flash storage media. Generally, DRAM has much lower latency than (e.g., up to 100 times lower) and provides for significantly higher IOPS (I/Os per second) capability than SCM. However, SCM as compared to DRAM offers persistent data storage, has a higher storage density for a given die area, and is less expensive. With SCM as compared to flash media, SCM read and write speeds may be, for example, more than 10 times faster than flash media and SCM can support higher TOPS while offering comparable throughput. Furthermore, data access in flash is at the block and page levels, but SCM can be addressed at finer, smaller levels of granularity, such as at the byte, bit and/or word level. This granularity eliminates the typical requirement of flash media to erase an entire block to program it, and it also simplifies random access and wear leveling. However, the price per gigabyte (GB) of SCM may be substantially more than flash media. In addition to the 3D XPoint® memory storage product, another example of SCM is Z-SSD® memory storage product by Samsung. It should be noted that both of the foregoing are examples of SCM that provide comparable performance metrics but each is based on fundamentally different technologies. In the 3D XPoint® product, the bit storage is based on the difference in resistance of the bulk material. The Z-SSD® product however, is based on the widely used floating-gate transistors to store bits: single-level cell (SLC) and multilevel cell (MLC). Thus, SCM may be generally based on any suitable technology and not limited to one or more particular technologies. (e.g., SCM may also include memory based on phase change memory (PCM) as well as others known in the art).

In one aspect, as discussed above, SCM may be characterized in terms of its relative speed and performance compared to other forms of memory and storage in a data storage system. As another characteristic of SCM, SCM is generally addressable at finer/smaller levels of granularity, such as at the byte, bit and/or word level, for storing data (e.g., as compared to flash media which is written in larger size units, such as at the block or page level). As yet another characteristic of SCM, SCM provides for non-volatile persistent storage of data whereby the data stored in SCM is preserved during a power loss. Under high or heavy write I/O workloads, SCM performance also does not deteriorate to the same level as flash storage (e.g., SCM is not as adversely affected as flash storage in terms of performance under high or heavy write I/O workloads). SCM may also be characterized as a solid state form of memory or storage having no moving parts (e.g., as with rotating disk drives).

In at least one embodiment in accordance with techniques herein, a Markov model may be used. In particular, a discrete Markov Chain state machine (MCSM) may monitor write performance in an ongoing manner to dynamically update and revise the model and associated states. The MCSM may produce an output that denotes the risk, such as in terms of a percentage, of entering a high state (also referred to herein as a critical state) associated with a heavy write I/O workload. Thus, the risk denotes a prediction regarding the chance, probability or likelihood of entering a period of the heavy write I/O workload (e.g., high or critical state) in the next upcoming time period or interval. The probability of critical state (as output by the MCSM) may be provided as an input to the control system which then determines an amount, percentage or portion of WP data from the cache that will be diverted to SCM. The degree of predicted write pressure, as reflected by the risk percentage prediction output by the MCSM, determines the amount, percentage or portion of WP data diverted to SCM, such as in connection with destaging such WP data from cache. The controller may continue to adjust the amount, percentage or portion of WP data diverted to SCM as a means to relieve pressure regarding cache overconsumption for storing WP data until the system reaches stability (e.g., as may be determined by the controller in accordance with specified stability criteria). The foregoing and other aspects of techniques herein are described in more detail in following paragraphs.

In at least one embodiment, SCM is also a resource that may be used in connection with techniques described herein as well as for other uses. Thus, an embodiment may reserve an amount of SCM for exclusive use with techniques herein. The amount or capacity reserved may vary over time based on historical information and should be an amount sufficient to accommodate a worst case scenario based on an expected maximum write throughput for an expected maximum time duration. For example, historical information may indicate that the maximum amount of write throughput for a write I/O burst that has occurred is 8 GB s/second and that it lasted for at most 10 seconds. Based on this, it may be determined that in a worst case scenario, where all such WP data for the write I/O burst may be diverted to SCM, an amount of 80 GBs of SCM would be needed. Thus, the reserved capacity of SCM for use with techniques herein may be based on such maximum write burst rates or throughputs and associated time durations, such as based on observed characteristics of write workloads of historical information for a particular system. It should be noted that the amount of SCM reserved capacity needed may change over time, for example, as additional write workloads are observed. For example, the foregoing 8 GBs/seconds for 10 seconds may be the worst case scenario of write I/O activity recorded up to a first point in time. Subsequently, at a second later point in time, observed write I/O activity may include a recorded write I/O workload of 20 GB s/second for a time duration of 8 seconds. This observed write I/O activity at the second point in time may denote a revised worst case of maximum write I/O activity whereby additional SCM may be reserved to total 160 GBs (e.g., 20 GBs/second*8 seconds) to accommodate the updated revised worst case scenario of write I/O activity. In a similar manner, if a large amount of specified time, such as over a year, has elapsed since again observing the write I/O workload of 20 GB s/second for a time duration of 8 seconds, an embodiment may update the amount of SCM reserved by decreasing the reserved amount to accommodate the worst case scenario observed during the year time period. In this manner, the amount of SCM reserved may be dynamically modified or updated based on actual write I/O workloads observed during particular time periods. As yet another variation, an embodiment may vary the amount of SCM reserved for use with techniques herein based on historical data of worst case scenarios, for example, on different days of the week, different times of the same day, different weeks or months of the year, and the like. For example, based on historical data, it may be that a first worst case scenario—writes of 20 GBs/second for a time duration of 8 seconds—occurs every Friday sometime between noon and 5 p.m. and that a second worst case scenario—writes of 10 GB s/second for a time duration of 6 seconds—occurs Wednesday between 9 a.m. and 1 p.m. Accordingly, the amount of SCM reserved may also change for these two different scenarios, where 160 GBs (e.g., 20 GBs/second*8 seconds) of SCM may be reserved for use with techniques herein every Friday between noon and 5 p.m.; and where 60 GBs (e.g., 10 GBs/second*6 seconds) of SCM may be reserved for use with techniques herein every Wednesday between 9 a.m. and 1 p.m. Other different amounts of SCM may be reserved for other weekly time periods depending on observed worst case write I/O throughputs and associated durations for such defined weekly time periods.

In at least one embodiment in accordance with techniques herein, the controller or other suitable component may determine the amount of SCM to reserve for different time periods based on observed write I/O workloads of historical information. As a variation, an embodiment may at least specify a single amount of SCM that is reserved for use with techniques herein. The amount of SCM reserved may be configurable in some embodiments, for example, such as by setting a system parameter via a configuration file, user interface, or other mechanism that may be available in an embodiment.

Figure 7:
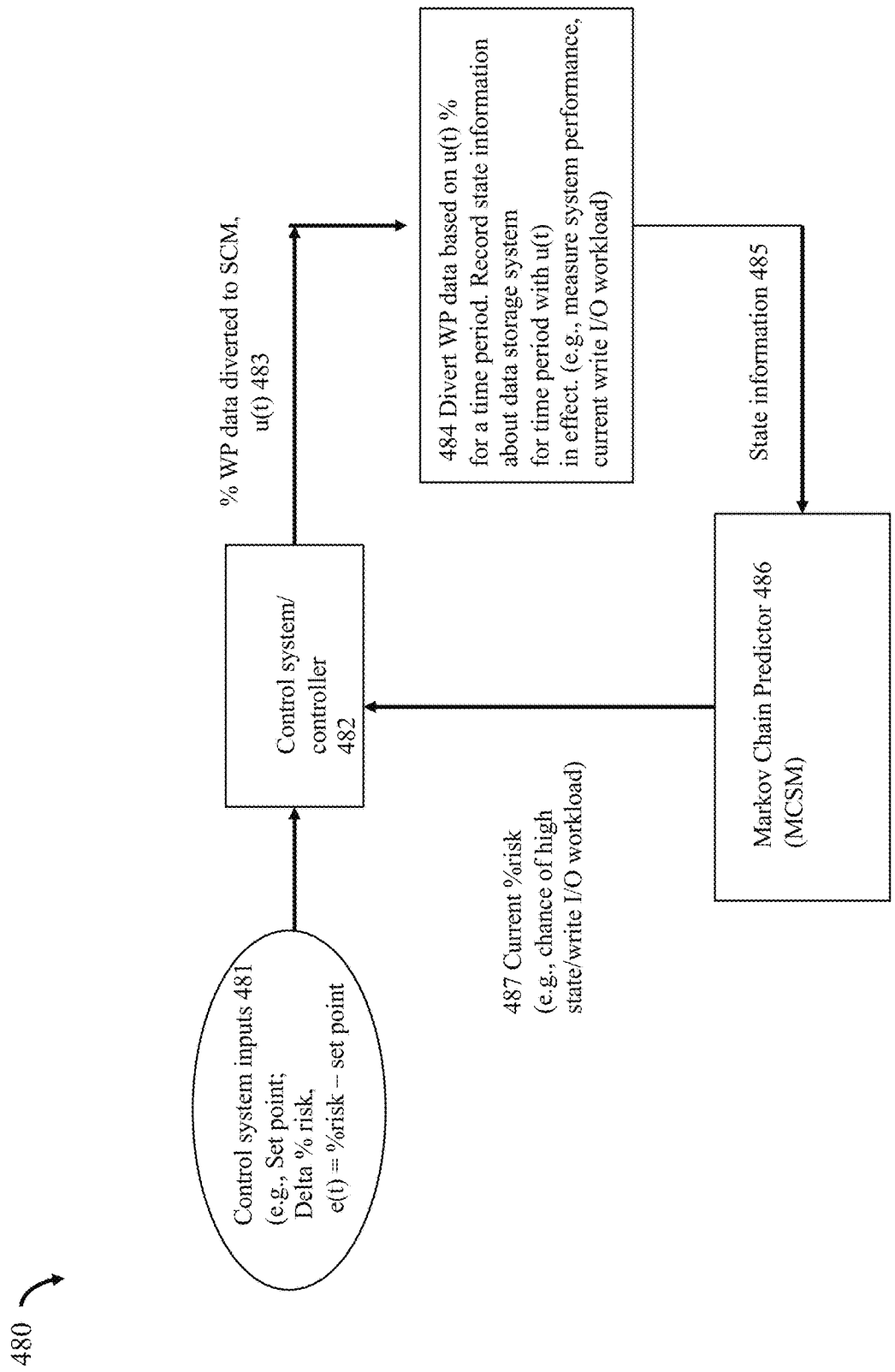
FIG. 7 is an example illustrating components and associated data flow in an embodiment in accordance with techniques herein.

Referring to FIG. 7, shown is an example of the components and data flow in an embodiment in accordance with techniques herein. The example 480 includes the control system 482 (sometimes also referred to as the controller), and the Markov Chain predictor 486 (also referred to sometimes as predictor) that includes the MCSM as described herein. State information 485 regarding the current state of the data storage system, such as the current write I/O workload for a time period, may be provided as input to the Markov Chain predictor 486. Based on state information 485 denoting the current state of the data storage system, the Markov Chain predictor 486 may update its own internal state information (described elsewhere herein) and may output 487 a current percentage (%), the current % risk, denoting the current % risk or chance of entering into the high state of a high critical heavy write I/O workload. The current % risk 487 output by the predictor 486 may be provide as an input to the control system 482. Additionally, the control system 482 may be provided with other inputs 481. In at least one embodiment, the inputs 481 to the control system/controller 482 may include a set point and a delta percent (%) risk. The set point is a target or goal, specified as a percentage, for the system's % chance of risk of entering the high or critical state associated with a heavy high critical write I/O workload. The set point may be a configurable parameter or value. In at least one embodiment, the set point may have a default predefined value, such as 10%.

The delta % risk at a point in time "t", also represented as "e(t)", included in inputs 481 denotes the difference between the set point and the current % risk output by the predictor 486 (e.g., e(t)=set point−% current risk). For example, if the set point is 10% and the predictor 486 predicts a current % risk 487 of 50%, then the control system works to reduce the risk of entering the high state by 40%. Generally, the delta % risk, e(t), will be less than zero when the system is not stable. If the delta % risk is equal to or greater than zero, the system may be characterized as being in a stable state.

The control system 482 determines output 483 in accordance with its inputs 487, 481 for a time period. The output 483 from the control system 482 may be a value, such as a percentage, denoting the percentage of WP data being destaged that is to be diverted to SCM. The output 483 from the control system 482 may also be represented as the variable "u(t)" in other description and equations herein. The control system 482 may implement a feedback algorithm that determines and revises its output, u(t) 483, based on revised current % risk 487 from the predictor. Element 484 denotes processing performed in the system to divert a percentage of the WP data being destaged to SCM in accordance with the percentage specified by u(t) 483. Typically, the value of u(t) may be characterized as in effect or applied for a time period during which state information 485 regarding the state of the data storage system may be recorded. Such state information 485 may include, for example, the current write I/O workload characteristics observed during the time period while u(t) is in effect. The write I/O workload characteristics may include the write throughput or rate at which data is written to the data storage system based on write I/Os received during the time period. For example, the write throughput rate may denote an amount of data written per unit of time, such as 5 GBs per second.

Generally, the processing loop illustrated in the example 480 denotes a feedback loop that may be performed in an ongoing continual manner. For a time period, state information 485 about the data storage system may be recorded and provided as an input to the predictor 486 that outputs a predicted current % risk for the next time period. The control system 482 may determine, in accordance with its inputs 481, 487, output u(t) 483 denoting a % of WP data that is destaged from cache that is to be diverted to SCM. With the current u(t) 483 in effect or applied for the next time period, the resulting state of the data storage system may again be observed and recorded as state information 485. In this manner, the predictor 486, and thus the control system 482 continually receives feedback and revised inputs based on the current state information characterizing a current state of the system with a current u(t) 483 in effect (whereby the percentage of WP data that is diverted to SCM is the percentage denoted by u(t) 483).

When the output of the Markov Chain Predictor 486 is at or below the set point, the control system 482 may determine that the data storage system is stable and may stop diverting WP data to SCM. While the system is stable with the output of the Markov Chain predictor 486 at or below the set point, the control system 482 may generate an output 483 that is non-zero whereby a % of cached WP data, denoted by u(t) 483, that is being destaged from cache is diverted to SCM.

Figure 8:
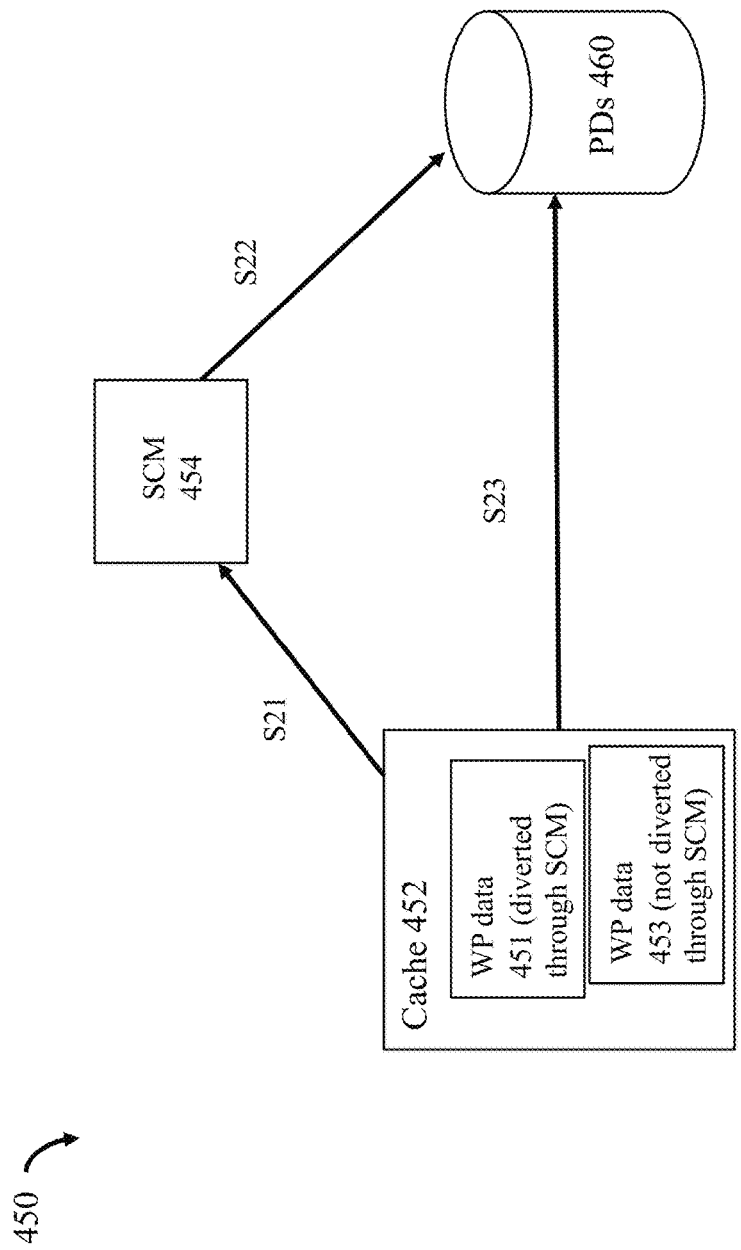
FIG. 8 is an example illustrating destaging of WP cached data in an embodiment in accordance with techniques herein.

Referring to FIG. 8, shown is an example of a modified I/O or data path of WP data in an embodiment in accordance with techniques herein. The example 450 denotes a portion of the I/O or data path in connection with write I/Os when destaging cached WP data. With reference back to FIG. 3, illustrated is what may be characterized as a normal I/O or data path in connection with processing a write I/O operation. Steps S3 and S4 of FIG. 3 may denote the destaging of WP data from cache 208 to the backend non-volatile storage PDs 212. In connection with techniques herein and with reference to FIG. 7, at least a portion of the WP data 451 stored in cache 452 may be diverted to the SCM 454 when destaging WP data from cache 452. As described in more detail in following paragraphs, the controller may output a percentage denoting a percentage of WP data that is currently being destaged that is diverted S21 to the SCM 454. In this manner, SCM 454 may serve as an intermediate or temporary storage of the WP data 451 that has been diverted. At some later point in time, WP data 451 that is stored in the SCM 454 may be written S22 to the backend non-volatile storage PDs 460. Alternatively, for that portion of the WP data 453 of cache 452 that is not redirected to the SCM 454, such WP data 453 may be destaged directly S23 to the backend non-volatile storage PDs 460.

In at least one embodiment, WP data from SCM 454 may be written S22 to the backend non-volatile storage PDs 460 as a background process, for example, running when the system utilization is low or idle such as when the write throughput is in the low state.

Figure 9:
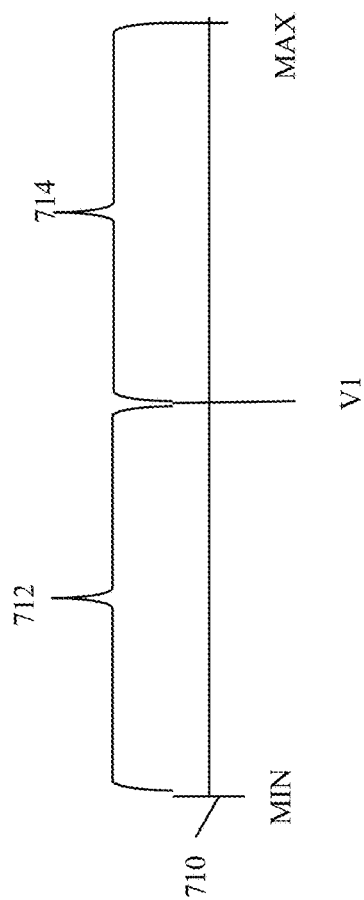
FIG. 9 is an example illustrating use of techniques to randomly select WP data for redirection to storage class memory in an embodiment in accordance with techniques herein.

Generally a decision of what particular WP data cache pages to divert to SCM may be made using any suitable technique so long as the decision is made in accordance with the specified percentage of WP data to be diverted as output by the controller. One example of a technique that may be used to randomly select WP data, that is being destaged from cache, to be diverted to SCM will now be described with reference to FIG. 9. The example 700 includes element 710 denoting an inclusive range of numbers, such as a range of integers, having a minimum MIN and a maximum MAX. The range may represent the range of possible or allowable numbers that may be output by a random number generator. For example, assume the random number generator may randomly output a number in the range from 1 to 100, inclusively. In this case MIN=1 and MAX=100. The range 710 may partitioned into a first subrange 712 and a second subrange 714 based on the current u(t) denoting the % WP data that is diverted to SCM when destaged from cache. V1 may denote a corresponding value of the range 710 corresponding to u(t) whereby 712 denotes a percentage of the numbers of range 710 equal to u(t) and 714 denotes the remaining portion of the range For example, if u(t) is 50% whereby 50% of all WP data destaged from cache is to be diverted to SCM, V1 denotes 50 whereby 712 denotes the inclusive subrange of integers from 1 to 50, and 714 denotes the inclusive subrange of integers from 51-100. When a page, or other chunk of WP data is being destaged from cache, a random number within the range 710 is generated and associated with the WP data chunk. If the random number is within subrange 712, the WP data is redirected to SCM (e.g., as denoted by S21 of FIG. 8). Otherwise, if the random number is within subrange 714, the WP data is not redirected to SCM and is directly destaged to the PDs (e.g., as denoted by S23 of FIG. 8).

What will now be described in more detail is the MCSM that may be used in an embodiment in accordance with techniques herein. Generally, Markov chains and models are known in the art. A Markov chain may be characterized as a stochastic model describing a sequence of possible events in which the probability of each event depends only on the state attained in the previous event. A Markov chain is a stochastic process with the Markov property. The term "Markov chain" refers to the sequence of random variables a process moves through, with the Markov property defining serial dependence only between adjacent periods (as in a "chain"). Therefore Markov chains may be used for describing systems that follow a chain of linked events, where what happens next depends only on the current state of the system. The changes of state of the system are called transitions. The probabilities associated with various state changes are called transition probabilities. The process is characterized by a state space, a transition matrix, describing the probabilities of particular transitions, and an initial state (or initial distribution) across the state space. It is assumed that all possible states and transitions have been included in the definition of the process or model, so there is always a next state, and the process does not terminate. The Markov property states that the conditional probability distribution for the system at the next step (and in fact at all future steps) depends only on the current state of the system, and not additionally on the state of the system at previous steps.

Markov chains can be represented by finite state machines. The idea is that a Markov chain describes a process in which the transition to a state at time t+1 depends only on the state at time t. The transitions in a Markov chain are probabilistic rather than deterministic, which means that it cannot be determined with certainty what will happen at the next time t+1. While a Markov chain is a state machine, its transitions are stochastic or random, and described by its transition probabilities. In one aspect, a Markov chain is a process that moves successively through a set of states $s_1$, $s_2$, ..., $s_r$, ... whereby when in state $s_i$, the process moves on to the next state $s_j$ with probability $p_{ij}$. The transition probabilities may be expressed in the form of a transition matrix. Thus, the MCSM may be characterized as a probabilistic version of a state machine with transitions defined in terms of probabilities.

In at least one embodiment in accordance with techniques herein, the MCSM may include 3 states—Low, Medium and High—that represent the relative write throughput ranges for a particular data storage system. The write throughput or workload boundaries for the states may be defined based on the maximum write throughput capabilities of the particular data storage system. For example, assume that components of a data storage system for which techniques herein are performed have a maximum write throughput capability of 8 GBs per second, then the entire range of write throughputs from 0 through 8 GBs/second, inclusively, may be partitioned into 3 subranges, each associated with a different one of the 3 states. The 3 subranges may comprise the complete range and may be defined as different non-overlapping portions of the entire range. For example, in at least one embodiment with 3 states and the maximum write throughput capability of 8 GB s/second, the low state may be defined as less than 2 GBs/second; the medium state may be defined as the inclusive subrange from 2 GBs/second to 4 GBs/second; and the high state may be defined as greater than 4 GBs/second (e.g., up to the maximum of 8 GBs/second). Generally, an embodiment may include any suitable number of states and is not limited to the particular number or associated write throughput ranges as described herein for purposes of illustration. The MCSM includes a matrix of state transitions that are learned over time and may be accordingly revised and adapted dynamically as observed actual write I/O throughput rates may also change over time. In at least one embodiment, the state of the system (e.g., write throughput) may be sampled at 30 second intervals or time periods and, based on the observed write throughput of each particular interval or time period, the system is assigned one of the 3 defined states. The count or frequency of state transitions may be accumulated based on the previous state.

Figure 10:
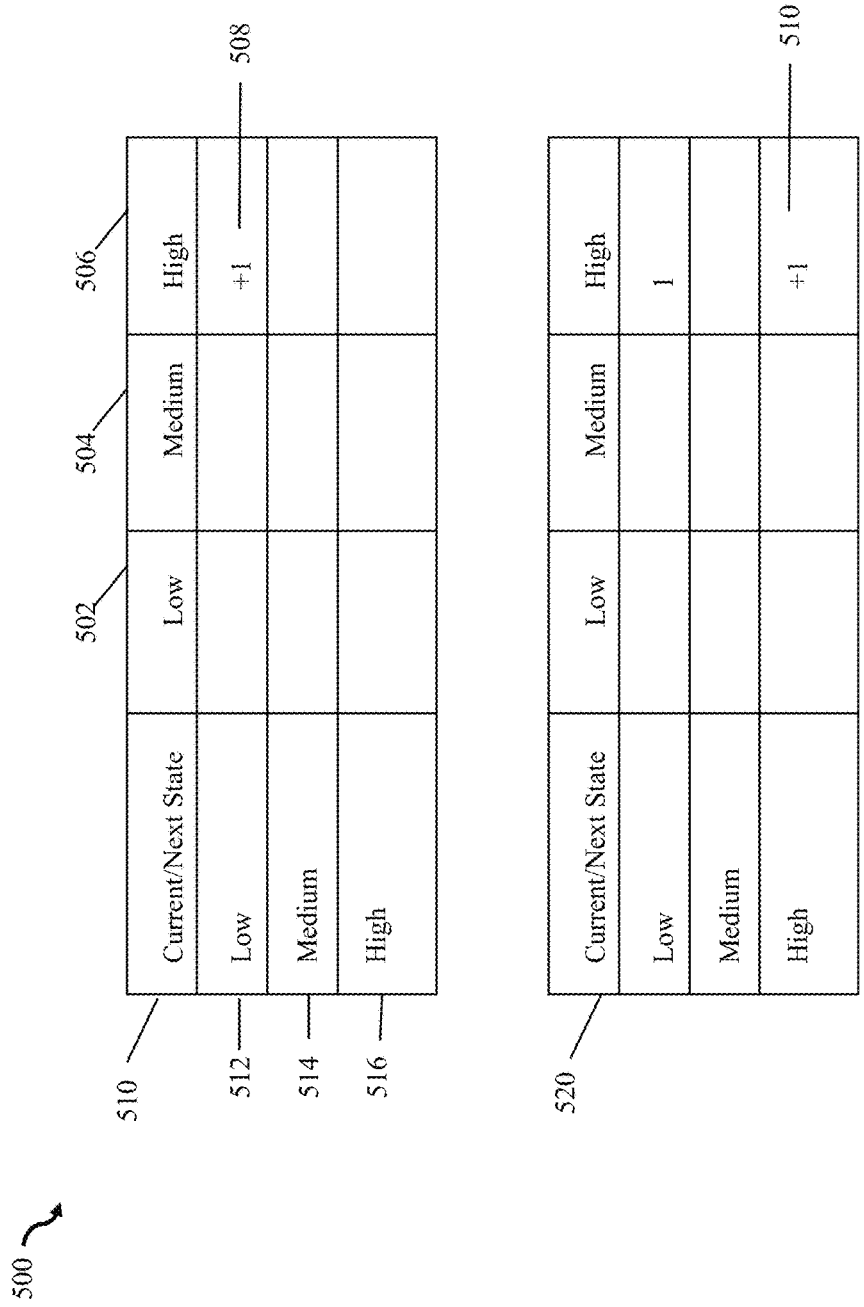

Referring to FIG. 10, shown is a first matrix or table of states and associated counters or frequencies. Elements 512, 514 and 516 denote, respectively, the low, medium and high current states and element 502, 504 and 506 denote, respectively, the low, medium and high next states. When in one of the current states 512, 514 or 516, the system then transitions to one of the next states 502, 504 or 506. Thus each cell or entry of the matrix 510 has a row dimension denoting the current state and a column dimension denoting the next state. For example, with reference to FIG. 10, assume the system is starting up and the system is currently, at the start of time period 0, in the low state having a measured write throughput of 1 GB/second. After the time period 0, the state may have a measure write throughput of 7 GB s/second and has therefore transitioned from the previous low state to the high state whereby the current count in the (low, high) cell 508 is incremented by 1.

Now, at the end of time period 0/beginning of time period 1, the system is in the current state of high and, after ending the time period 1, the write throughput may again be observed as being more than 4 GBs/second and is thus in the high state. Element 520 may represent the matrix 510 that has been updated at the end of time period 1 to reflect the transition from high state to high state where the entry or cell (high, high) as denoted by 510 is increment by 1. The foregoing continues over time and knowledge is built up based on observed write throughputs corresponding to particular current and next states, respectively, at the beginning and end of each time period. Assume in this example the foregoing continues over time whereby appropriate counters of the different cells of the transition matrix 520 is further updated. Referring to FIG. 11, shown is transition matrix 610 that represents the resulting matrix updated at a much later point in time based on observed write throughputs corresponding to particular current and next states, respectively, at the beginning and end of each successive time period. From the counters or frequencies of 610, the probabilities of each cell or entry of the matrix may be calculated. For example, each row denotes a different set of probabilities that equal 100%. For example, probabilities may be calculated for row 612 whereby the total sum of the counters 616a-c in the cells or entries in the row 612 equal 100% for the total sum of the current low state. In this example, the total sum of row 612 is 12,342+4357+1890=18,589. The probability of remaining in the low state (transitioning from the current low state to the next low state denoted by cell 616a), is 12342/18,569=66.4% (as denoted by 622a of matrix 620). In a similar manner, probabilities for the counters of cells 616b-c may be calculated resulting in percentages 622b-c, respectively. In a similar manner, for rows of counters 614 and 616, processing may be performed to determine transition probabilities as denoted, respectively, by rows 624 and 626 of matric 620. Thus, matrix 620 may include the transition probabilities for the corresponding counters or frequencies denoted in 610. In a similar manner, an embodiment may continually update counters 610 of the transition matrix 610 as each time period completes based on observed write throughputs at the start and end of each time period to respectively denote the observed current and next states. In this manner, historic information regarding observed or recorded states may be used to learn and characterize the transitions of write throughput states for the particular data storage system. Additionally, the corresponding state transition probabilities of 620 may also be continually updated in an ongoing manner based on continually revised/updated counters of 610. Thus, the foregoing provides for adaptive and continuous learning regarding the transitions of write throughput states for the particular data storage system.

In the embodiment described in connection with FIGS. 10 and 11, the high state may denote a critical state of high, heavy write I/O workload and throughput. When in the high state, the data storage system may be characterized as being in an undesirable or overloaded state. Accordingly, for a given observed write I/O throughput at a point in time, the MCSM may determine a current state of low, medium or high and, based on its current probability transition matrix may output a probability or percentage denoting a % risk of transitioning to the undesirable high state. For example, assume the current write throughput is 2 GBs/second denoting the current low state. At this point, the MCSM, and thus the predictor 486, may output a % risk=10.2% as denoted by 622c. In other words, the predictor may consult the transition matrix 620 and locate row 622 corresponding to the current state of low. In that row, the predictor may output the % risk associated with transitioning into the high state as the "next" state, which corresponds to the probability of cell 622c. At the next time period (assuming the same percentages as in 620), if the current system state of write throughput corresponds to the medium state, row 624 may be consulted and the predictor may output the % risk associated with transitioning to the high state as the "next" state, which corresponds to the probability of 10.1% in cell 624c.

Figure 12:
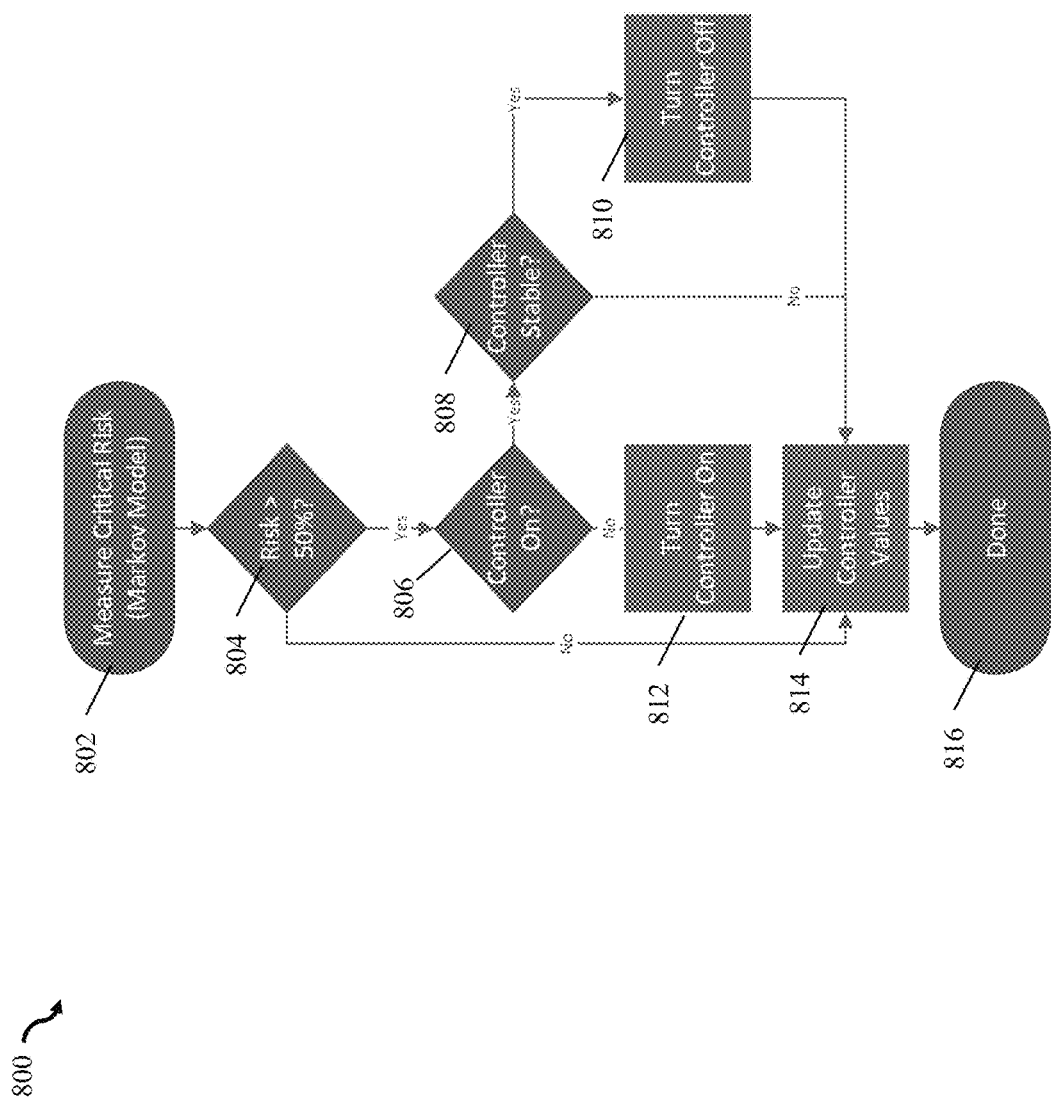
FIG. 12 is a flowchart of processing steps that may be performed in an embodiment in accordance with techniques herein.

Based on the current % risk 487 output by the predictor 486, the control system/controller 482 may or may not be activated. Referring to FIG. 12, shown is a flowchart 800 of processing steps that may be performed in an embodiment in accordance with techniques herein at the end of each time period or time interval. At step 802, the MCSM and predictor 486 may determine a predicted value for the current % risk 487 of entering into the high or critical write throughput state. From step 802, control proceeds to step 804. At step 804, a determination may be made as to whether the current % risk 487 is greater than a specified threshold percentage, such as 50%. If step 804 evaluates to no, control proceeds to step 814 where the controller/control system 482 values may be updated based on the current % risk 487 output by the predictor 486. Processing performed in connection with step 814 is described in more detail elsewhere herein where the control system/controller 482 determines its output 483, u(t), denoting the % of cached WP data that is diverted to SCM. From step 814, control proceeds to step 816 where processing is done for the current time period. Upon the occurrence of the next time period completing, processing of the flowchart 800 may be again performed. If step 804 evaluates to yes, control proceeds to step 806 where a determination is made as to whether the controller/control system 482 is on/activated. If step 806 evaluates to yes, control proceeds to step 808 where a determination is made as to whether the current state determined by the controller denotes a stable system state. As described herein, a stable state may be determined by step 808 if the current % risk output by the predictor is equal to or less than the set point, such as 10%. If step 808 evaluates to yes, control proceeds to step 810 where the controller may be turned off and control then proceeds to step 814 to update the controller/control system values. If step 808 evaluates to no, control proceeds to step 814.

In this manner, based on the flowchart 800 of FIG. 12, when the controller/control system 482 is active, the controller/control system 482 may be used to determine the output u(t) 483 as a non-zero percentage denoting the % of WP data diverted to SCM. If the controller/control system 482 is inactive, then no WP data is diverted or redirected to the SCM.

Figure 13:
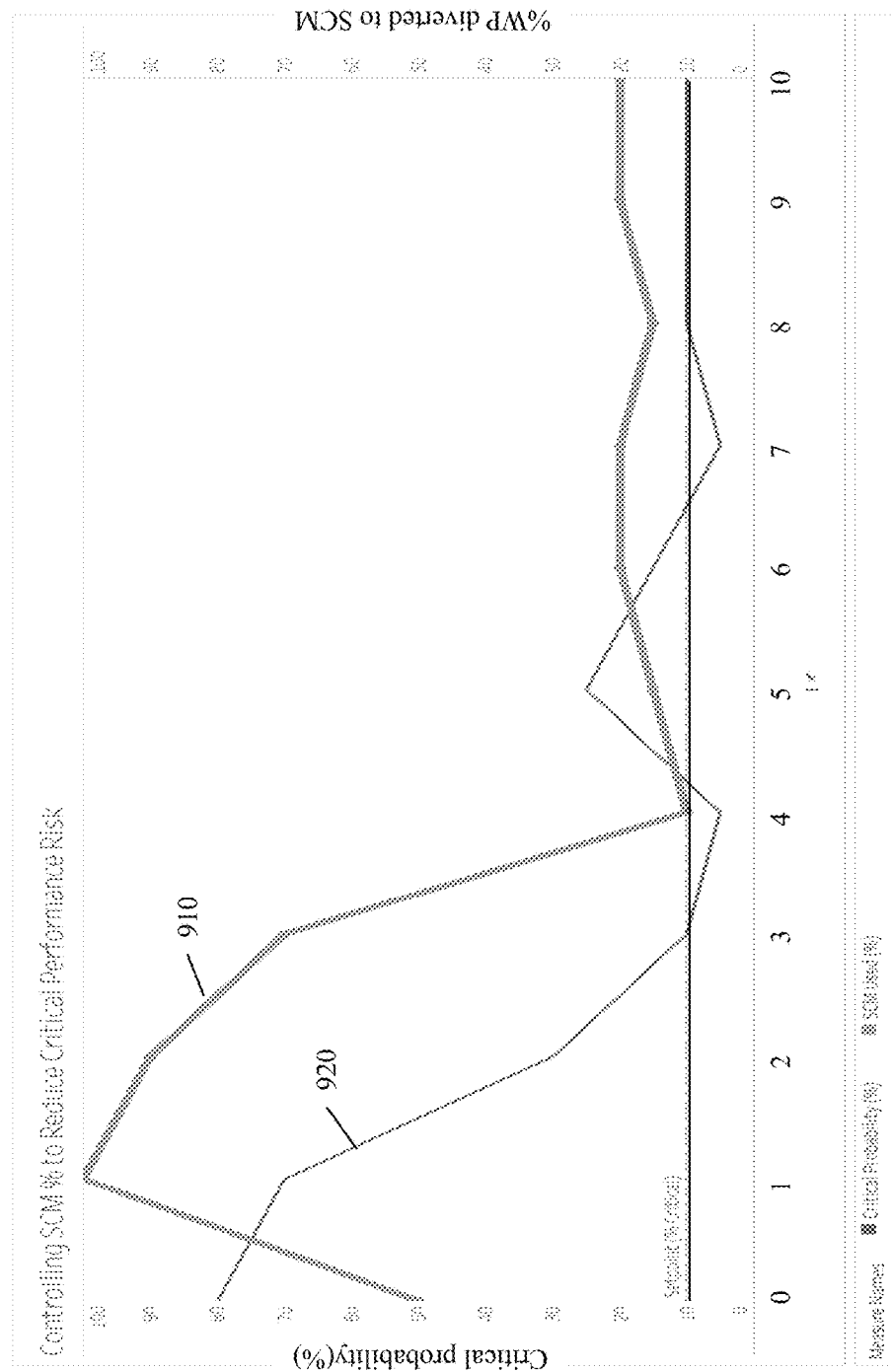
FIG. 13 is a graphical illustration of values determined over time in an embodiment in accordance with techniques herein.

Referring to FIG. 13, shown is an example 900 illustrating results obtained by the inventors in connection with use of techniques herein. The example 900 is a graph illustrating results obtained for different predicted % risk values 487 output by the predictor 486 over time and the associated values of u(t) 483 over time (e.g., denoting the different percentages of WP data diverted to SCM over time). The X axis is the sample time denoting 30 second intervals where every 30 second interval the control system takes values from the predictor 486 and outputs a new value for the u(t), the % of WP data redirected. Line 920 denotes the different outputs of the predictor over time showing the change in potential predicted % risk (of entering the high state) over 10 samples. The goal is to get the risk down to the set point, for example, such as 10% in this case. Line 910 is the output of the control system/controller 482 denoting different u(t) values (e.g., % WP data diverted to SCM). Based on the graph of 900, as more WP data is diverted to SCM, the system performance risk (e.g., % risk output or predicted by predictor 486) drops.

What will now be described in more detail is one model that may be used by the controller/control system 482 to control and determine u(t), the percentage of WP data redirected to SCM based on the input % risk 487. The general equation used by the controller/control system 482 in at least one embodiment may be:

$$u(t) = K_p e(t) + K_i \int_0^\tau e(\tau)d\tau + K_d \frac{de(t)}{dt} \qquad \text{EQUATION 1}$$

where u(t) is the next output value generated by the controller denoting the % WP data redirected or diverted to SCM;

e(t) is the error, or delta % risk;

Kp, Ki, and Kd are three weighting constants;

t is the current time; and

τ is the variable of integration denoting the time from when the control was last turned on to the current time, t.

EQUATION 1 includes 3 terms that may be further characterized as follows. A first term, KPout may correspond to $K_p e(t)$ of EQUATION 1. A second term KIout may correspond to $K_i \int_0^\tau e(\tau)d\tau$ of EQUATION 1. A third term KDout may correspond to $$K_d \frac{de(t)}{dt}$$

of EQUATION 1. In at least one embodiment, the above mentioned three weighting constants may be calculated based on testing systems under various write workloads and tuning them manually. The Kp term, KPout, is a term for the weighted current error, e(t) for the current time period. The Ki term, KIout, adds a weighted term based on the error e(t) over time (e.g., hence the integral). Finally, the Kd, KDout, adds a weighted term based on the rate of change of the error, or difference in error between the immediately prior time period "t−1" and the current time period "t".

For a given time period, t, KPout is simply the mathematical product of the constant Kp and e(t). KIout for a time period, t, may be calculated by adding the errors, e(t) values, for all time periods from when the controller was last turned on/activated (t=0) to the current time, t, and then multiplying that sum by the constant Ki. KDout for a time period, t, may be calculated by determining the difference between e(t) and e(t−1) (e.g., e(t)−e(t−1)), and then multiplying the difference by the constant Kd.

Thus generally, EQUATION 1 includes 3 weighted terms for the current error e(t), the error over time since the controller was activated, and the change in error with respect to the current and previous time periods. For example, consider a controller with the following weighted constants:

Kp=0.5 Ki=0.006 Kd=0.2

Processing may be performed to illustrate the behavior of the system using techniques herein by starting the system at time=0 with a current % risk (Critical Risk) output by the predictor of 80% with a set point or target of 10% risk.

| Time | % Risk (487) | KPout | KIout | KDout | % WP redirected (u(t) 483) |
|---|---|---|---|---|---|
| 0 | 80 | −35 | −0.42 | 0 | 35.42 |

At the next sampling period or interval, t=1, assume the % Risk is 44.58; then

KPout=0.5*−34.58=−17.29;

KIout=0.006*(−70+−34.58)=−0.63;

KDout=0.2*(−70+34.58)=−7.08; and

% WP redirected(u(t)483)=25

In a similar manner, calculations may be performed to determine values for multiple subsequent time or sampling periods. Assume, for example, for time period t=15, the % Risk is less than the set point 10. In this case, at t=15, the system may be in a stable state and the % WP redirected (u(t) 483) determined by the controller is zero. For example, assume the following denotes the controller values and time t=15:

| Time | % Risk (487) | KPout | KIout | KDout | % WP redirected (u(t) 483) |
|---|---|---|---|---|---|
| 15 | 9.75 | 0.13 | 0.33 | 0.13 | 0 |

In at least one embodiment, techniques herein provide for a system that combines machine learning and a control system to improve data storage system performance by diverting a portion of WP data to SCM when destaging cached WP data. Techniques as described herein provide a further advantage of responding to I/O traffic bursts quickly. As described herein, at least one embodiment in accordance with techniques herein may include a MCSM that employs machine learning to learn and dynamically update and adapt the MCSM. The MCSM predicts the probability of a high state write throughput in the future. A controller/control system may be used to decide the percentage of WP data to redirect to SCM when destaging cached WP data. The system continuously provides feedback to components including the predictor 486, to revise and update the MCSM based on changing current state information while diverting a portion of WP data during destaging in accordance with the amount output by the control system. The control system is also provided feedback with a revised predicted % risk of transitioning to the high state of high write throughput.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
    determining a first amount denoting an amount of write pending data stored in cache to be redirected through storage class memory (SCM) when destaging cached write pending data from the cache;
    performing first processing that destages write pending data from the cache, the first processing including:
        selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and
        subsequent to storing the first portion of write pending data to the SCM, transferring the first portion of write pending data from the SCM to the one or more physical storage devices providing back-end non-volatile physical storage;
    determining, using a Markov chain state machine (MCSM) included in a predictor, a predicted probabilistic risk of transitioning from a current state to a high state of heavy write throughput; and
    providing the probabilistic risk from the predictor as an input to a controller, wherein the MCSM uses a matrix of state transition probabilities to determine the predicted probabilistic risk of transitioning from the current state to the high state of heavy write throughput.

2. The method of claim 1, wherein a relative performance ranking ranks the cache as having a higher performance than the SCM, and the SCM as having a higher performance than the one or more physical storage devices providing back-end non-volatile physical storage.

3. The method of claim 2, wherein the SCM is byte addressable.

4. The method of claim 1, wherein the controller determines the first amount in accordance with a plurality of inputs including the predicted probabilistic risk of transitioning from the current state to the high state of heavy write throughput.

5. The method of claim 4, wherein the first plurality of inputs to the controller further include a set point denoting a current acceptable level of probabilistic risk of transitioning to the high state of heavy write throughput, and a delta risk value that is a difference between the current acceptable level of probabilistic risk and the predicted probabilistic risk of transitioning from the current state to the high state of heavy write throughput.

6. The method of claim 5, wherein the first amount is expressed as a first percentage denoting a percentage of write pending data to be destaged indirectly through the SCM.

7. The method of claim 5, wherein the controller determines the first amount for a current time period in accordance with the delta risk value for the current time period and a first weighting constant, a sum of delta risk values from time periods prior to the current time period and a second weighting constant, and a rate of change in delta risk values for the current time period and an immediately prior time period and a third weighting constant.

8. The method of claim 1, wherein the matrix of state transition probabilities used by the MCSM is determined by observed transitions between states in accordance with observed write throughput.

9. The method of claim 8, wherein the MCSM includes three states and the matrix includes nine entries denoting transitions from a current state denoting one of the three states to a next state denoting one of the three states.

10. The method of claim 9, wherein each of the three states is associated with a different range of write throughput.

11. A system comprising:
    a processor; and
    a memory comprising code stored thereon that, when executed, performs a method of processing data comprising:
        determining a first amount denoting an amount of write pending data stored in cache to be redirected through storage class memory (SCM) when destaging cached write pending data from the cache;
        performing first processing that destages write pending data from the cache, the first processing including:
            selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and
            subsequent to storing the first portion of write pending data to the SCM, transferring the first portion of write pending data from the SCM to the one or more physical storage devices providing back-end non-volatile physical storage;
        determining, using a Markov chain state machine (MCSM) included in a predictor, a predicted probabilistic risk of transitioning from a current state to a high state of heavy write throughput; and
        providing the probabilistic risk from the predictor as an input to a controller, wherein the MCSM uses a matrix of state transition probabilities to determine the predicted probabilistic risk of transitioning from the current state to the high state of heavy write throughput.

12. A non-transitory computer readable medium comprising code stored thereon that, when executed, performs a method of processing data comprising:
    determining a first amount denoting an amount of write pending data stored in cache to be redirected through storage class memory (SCM) when destaging cached write pending data from the cache;

performing first processing that destages write pending data from the cache, the first processing including:
   selecting, in accordance with the first amount, a first portion of write pending data that is destaged from the cache and stored in the SCM and a second portion of write pending data that is destaged directly from the cache and stored on one or more physical storage devices providing back-end non-volatile physical storage; and
   subsequent to storing the first portion of write pending data to the SCM, transferring the first portion of write pending data from the SCM to the one or more physical storage devices providing back-end non-volatile physical storage;
determining, using a Markov chain state machine (MCSM) included in a predictor, a predicted probabilistic risk of transitioning from a current state to a high state of heavy write throughput; and
providing the probabilistic risk from the predictor as an input to a controller, wherein the MCSM uses a matrix of state transition probabilities to determine the predicted probabilistic risk of transitioning from the current state to the high state of heavy write throughput.

13. The non-transitory computer readable medium of claim 12, wherein a relative performance ranking ranks the cache as having a higher performance than the SCM, and the SCM as having a higher performance than the one or more physical storage devices providing back-end non-volatile physical storage.

14. The non-transitory computer readable medium of claim 13, wherein the SCM is byte addressable.

15. The non-transitory computer readable medium of claim 12, wherein the controller determines the first amount in accordance with a plurality of inputs including the predicted probabilistic risk of transitioning from the current state to the high state of heavy write throughput.

16. The non-transitory computer readable medium of claim 15, wherein the first plurality of inputs to the controller further include a set point denoting a current acceptable level of probabilistic risk of transitioning to the high state of heavy write throughput, and a delta risk value that is a difference between the current acceptable level of probabilistic risk and the predicted probabilistic risk of transitioning from the current state to the high state of heavy write throughput, and wherein the controller determines the first amount for a current time period in accordance with the delta risk value for the current time period and a first weighting constant, a sum of delta risk values from time periods prior to the current time period and a second weighting constant, and a rate of change in delta risk values for the current time period and an immediately prior time period and a third weighting constant.

* * * * *